United States Patent [19]
Iwaki et al.

[11] Patent Number: 4,488,070
[45] Date of Patent: Dec. 11, 1984

[54] ALTERNATING CURRENT GENERATOR FOR A CAR HAVING A MULTI PART PARTITION PLATE FOR AIDING A COOLING FAN

[75] Inventors: Yoshiyuki Iwaki, Himeji; Hideo Imori, Hyogo; Hitoshi Gotou, Himeji, all of Japan

[73] Assignee: Mitsubishi Denki Kabushiki Kaisha, Tokyo, Japan

[21] Appl. No.: 556,601

[22] Filed: Nov. 30, 1983

[30] Foreign Application Priority Data

Nov. 30, 1982 [JP] Japan ................ 57-182818[U]

[51] Int. Cl.³ ........................................ H02K 9/00
[52] U.S. Cl. .............................. 310/62; 310/63; 310/68 D
[58] Field of Search ............ 310/52, 58, 59, 60 R, 310/62, 63, 68 D, 239

[56] References Cited
U.S. PATENT DOCUMENTS 4,275,321 6/1981 Shimamoto et al. ............ 310/63 X
4,418,295 11/1983 Shiga ............................. 310/59
4,419,597 12/1983 Shiga et al. ................. 310/68 D

FOREIGN PATENT DOCUMENTS

WO82/01966 6/1982 PCT Int'l Appl. ........... 310/68 D

Primary Examiner—Mark O. Budd
Attorney, Agent, or Firm—Oblon, Fisher, Spivak, McClelland & Maier

[57] ABSTRACT

A partition plate structure for a cooling fan for an alternating current generator constructed in such a manner that an inner part of the rear bracket is inwardly extended in the radial direction to provide an extended surface so as to face the blade with a predetermined distance in an area where the rectifier and the brush holder are not placed; a first partition plate to be fastened to the rear bracket together with the rectifier and a second partition plate to be fastened to the rear bracket together with the brush holder are respectively placed in the rear bracket so as to be substantially flush with the extended surface.

5 Claims, 8 Drawing Figures

ALTERNATING CURRENT GENERATOR FOR A CAR HAVING A MULTI PART PARTITION PLATE FOR AIDING A COOLING FAN

BACKGROUND OF THE INVENTION

1. Field of the Invention

The present invention relates to an alternating current generator for a car. More particularly, it relates to an improvement in the structure of a partition plate for a cooling fan.

2. Description of the Prior Art

Generally, in an open type a.c. generator for a car, there has been known to use a cooling fan to cool the generator, the cooling fan being generally of a centrifugal type. In the centrifugal type fan, there has been proposed to use either a Sirocco fan in which a side plate is attached to a blade itself or a partition plate in a hollow disc form is used so as to keep a predetermined distance to the blade, in order to increase efficiency of the fan. However, the fans above-mentioned have drawback of complicated structure. The structure of a conventional fan will be described in more detail.

FIG. 1 is a cross sectional view of a conventional a.c. generator for a car in which the reference numeral 1 designates a field coil; 2 and 3 respectively designate front and rear magnetic poles; 4 and 5 respectively designate front and rear blades; 6 designates a rectifier; 7 designates a brush holder; 8 designates the side plate of the rear blade 5; 9 designates a rear bracket and 10 designates a front bracket.

When the generator is actuated by the engine of a car (not shown), the blades 4 and 5 are driven and air in the vicinity of the blades 4, 5 undergoes centrifugal force to go toward the outer circumference with the result that there takes place air flow as indicated by the arrow marks a and b.

As apparent from FIG. 1 that for the front blade 4, it is easy to keep a constant distance between the front bracket 10 and the blade 4 around the entire circumference, while for the rear bracket 9, it is impossible to keep relationship as above-mentioned because of presence of the rectifier 6 and the brush holder 7. It was, therefore, necessary to place a side plate 8 facing the blade 5 to form a constant distance. As one of technique to constitute such side plate 8, there is a proposal to form it by resin-molding as shown in FIG. 2. The side plate 8 formed by resin-molding, however, has a disadvantage that it may be broken when rotated at a high speed. FIG. 3 shows a side plate formed of a metal plate. The side plate requires complicated steps of forming fitting parts in a main body, and caulking or brazing the fitting parts.

FIG. 4 shows another examples of the conventional a.c. generator in which the reference numeral 11 designates a partition plate in a hollow disc form in a portion opposing the rear blade 5 so as to provide an equivalent structure to a Sirocco fan. Provision of the partition plate 11 has disadvantages such that a number of fastening parts has to be provided in it to obtain flatness of the surface of the partition plate and that when the partition plate is to be formed by resin-molding, a molding machine having a large capacity is required because the partition plate has a large surface area.

SUMMARY OF THE INVENTION

It is an object of the present invention to overcome the disadvantages of the conventional fan and to provide an improved partition plate structure for a cooling fan of an a.c. generator for a car formed in a simple manner.

The foregoing and the other objects of the present invention have been attained by providing an alternating current generator for a car having an improved partition plate structure which comprises blade attached to an outer surface of magnetic poles clamping a field coil and a rear bracket holding a rectifier and a brush holder at its bottom portion wherein an inner part of the rear bracket is inwardly extended in the radial direction to provide an extended surface so as to face the blade with a predetermined distance in an area where the rectifier and the brush holder are not placed; a first partition plate to be fastened to the rear bracket together with the rectifier and a second partition plate to be fastened to the rear bracket together with the brush holder are respectively placed in the rear bracket so as to be substantially flush with the extended surface.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the present invention will be described with reference to FIGS. 5 to 8.

Figure 1:
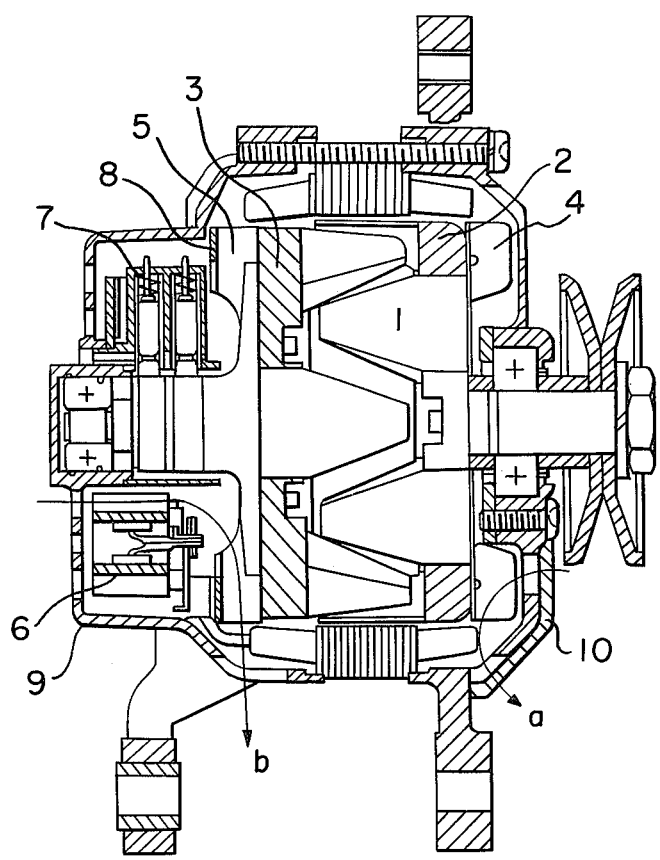
FIG. 1 is a cross sectional view showing the inner structure of the conventional a.c. generator.
Figure 2:
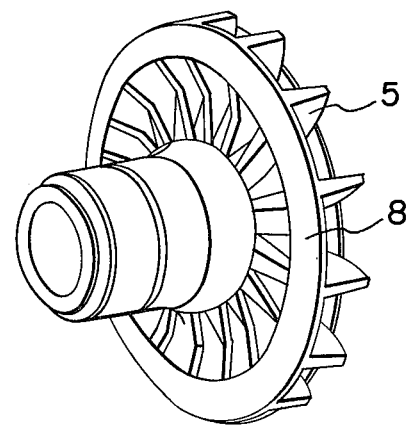
FIGS. 2 and 3 are respectively slant views of the conventional cooling fans.
Figure 3:
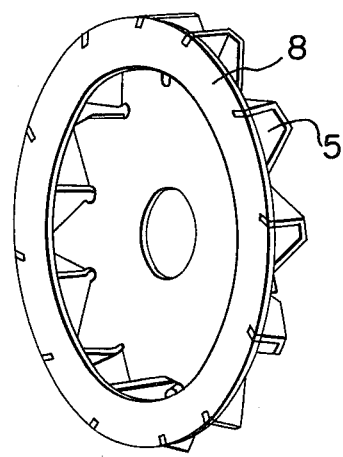
Figure 4:
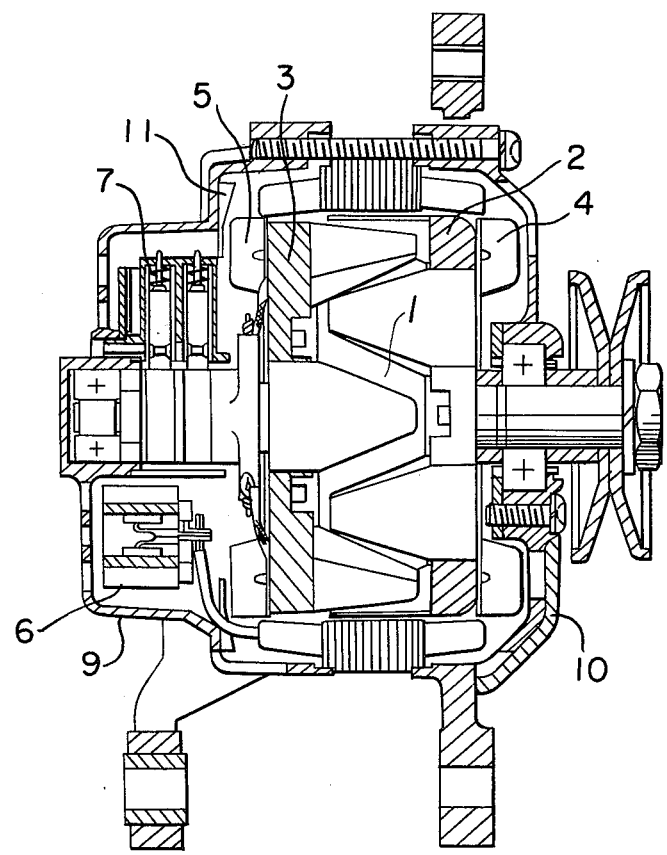
FIG. 4 is a cross sectional view showing the inner structure of the other conventional a.c. generator.
Figure 5:
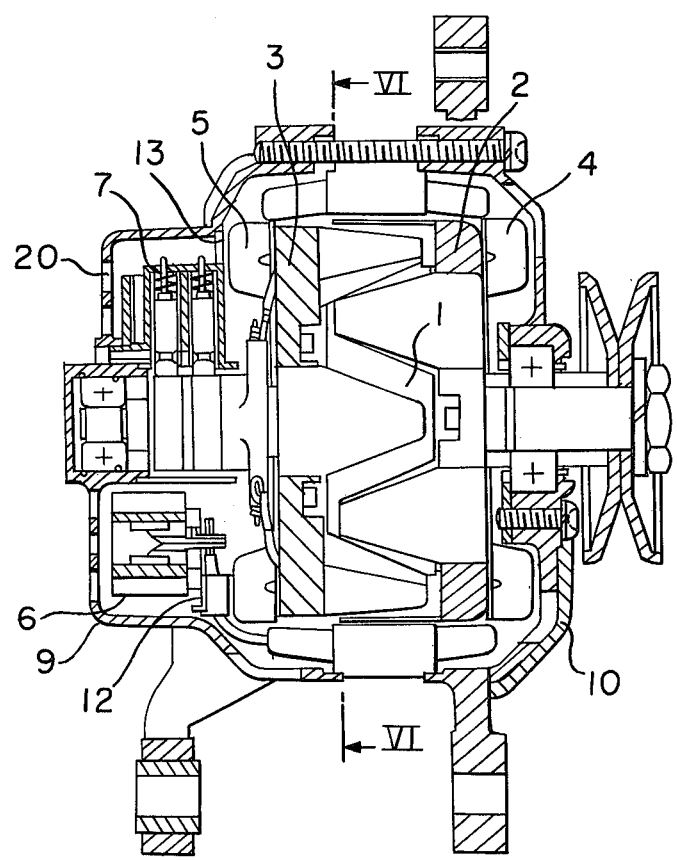
FIG. 5 is a cross sectional view showing the inner structure of an embodiment of an a.c. generator of the present invention; and, FIG. 6 is a front view showing the inner structure of the rear bracket from the line VI—VI in FIG. 5.
Figure 6:
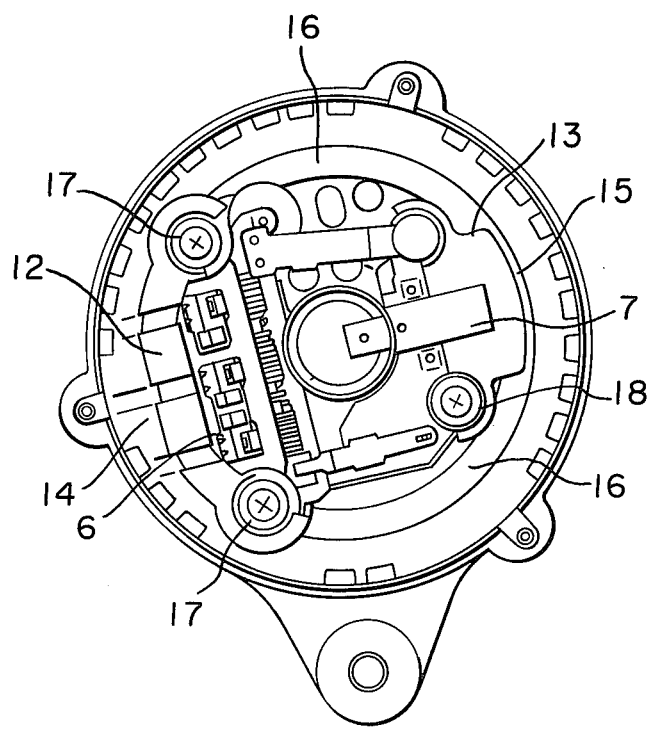
Figure 7:
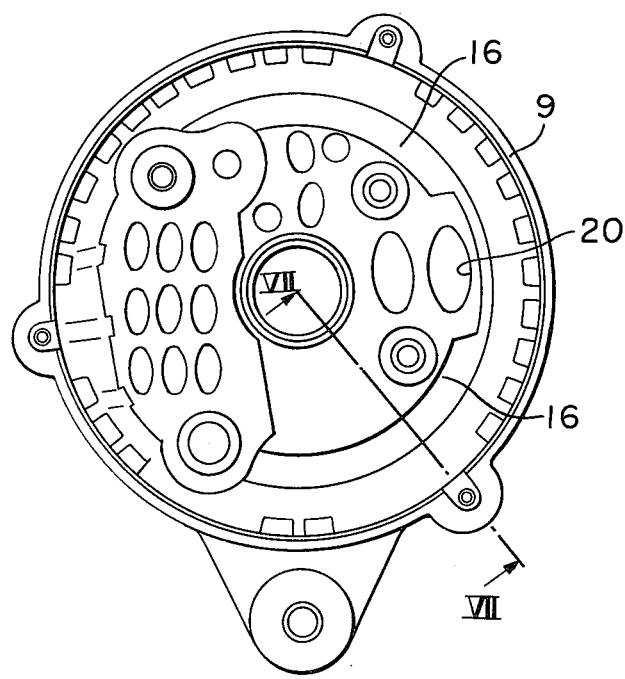
FIG. 7. is a bottom view of an embodiment of the rear bracket of the present invention.

In the rear bracket 9, a first partition plate 12 is place in an area 14 where the rectifier 6 is placed, so as to face the blade 5 rotating together with the rear magnetic pole 3 keeping a predetermined distance to the blade 5. The first partition plate 12 is generally in an arched form as shown in FIG. 6 and both ends of the arched partition plate 12 have respectively through holes through which countersunk head screws 17 are passed to fasten the partition plate 12 to the rear bracket 9 together with the rectifier 6. A second partition plate 13 is also placed in an area 15 where the brush holder 7 is placed, so as to face the rotating blade 5 keeping a predetermined distance to the blade 5. The shape of the second partition plate 13 can be in a generally arched form and it has at least one fitting hole through which a countersunk head screw 18 is passed to fasten the second partition plate 13 to the rear bracket 9 together with the brush holder 7. In FIG. 6, the second partition plate 13 is shown to have a shape in which the outer periphery is in a part of circle along the curvature of the inner wall of the rear bracket and the inner part is straightened between both ends each having a fitting hole.

Figure 8:
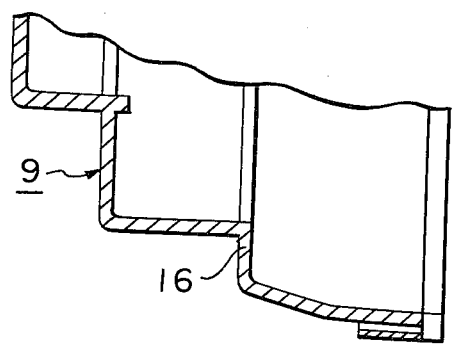
FIG. 8 is a cross sectional view, partly omitted, taken along the line VII—VII in FIG. 7.

In an area other than the rectifier locating area 14 and the brush holder locating area 15 in the bracket, there is formed an extended surface 16 facing the rotating blade 5 with a predetermined distance. The extended surface 16 can be a part of an annular plate radially extending from the inner wall of the rear bracket 9. However, it is preferable to form the extended surface by providing a stepped portion in the inner wall of the rear bracket to face the blade 5 with a predetermined distance as shown in FIG. 8.

Thus, the extended surface 16, the first partition plate 12 for rectifier 6 and the second partition plate 13 for the brush holder 7 cooperates to form a hollow disc facing the blade 5.

The construction as above-mentioned eliminates a problem of complicateness caused by attaching the side plate 8 to the blade 5 as in the conventional Sirocco fan structure. Further, since each of the first and second partition plates constituting a hollow disc in association with the extended surface is smaller in surface area than a single-structure partition plate of the conventional fan, hence the projecting area of each the partition plate can be small, a molding machine having a relatively small capacity can be used to resin-mold the partition plate pieces.

In addition, the conventional a.c. generator is constructed in such a manner that an air intake port 20 is formed in the end surface of the bracket 9 with the consequence that a distance from the air intake port to the blade 5 is so long that resistance to air flow becomes large, that is to say, the air flow rate becomes small. On the other hand, in the present invention, the first and second partition plates 12, 13 and the extended surface 16 can be provided near the intake port 20 in comparison with the conventional device whereby the length of the blade 5 in the axial direction can be greater thereby increasing air flow rate. As a result, the generator is effectively cooled.

In the foregoing, the description has been made as to a construction that partition plate pieces are respectively provided for the rectifier 6 and the brush holder 7. It may be omit either one depending on cooling efficiency.

What is claimed is:

1. An alternating current generator for cars having a partition plate structure which comprises a blade attached to an outer surface of magnetic poles clamping a field coil and a rear bracket holding a rectifier and a brush holder at its bottom portion, wherein an inner part of said rear bracket is inwardly extended in the radial direction to provide an extended surface so as to face said blade with a predetermined distance in an area where said rectifier and said brush holder are not placed; a first partition plate to be fastened to said rear bracket together with said rectifier and a second partition plate to be fastened to said rear bracket together with said brush holder are respectively placed in said rear bracket so as to be substantially flush with said extended surface.

2. An alternating current generator according to claim 1, wherein said first and second partition plates are formed by resin-molding.

3. An alternating current generator according to claim 1, wherein said first and second partition plates and said extended surface form a generally hollow disc.

4. An alternating current generator according to claim 1, wherein said extended surface is formed by a stepped portion of said rear bracket.

5. An alternating current generator according to claim 1, wherein said extended surface is formed by a generally annular plate inwardly extending from the inner surface of said rear bracket.

* * * * *